(12) United States Patent
Brevick et al.

(10) Patent No.: US 9,683,905 B2
(45) Date of Patent: Jun. 20, 2017

(54) TRANSMISSION AND TRANSFER CASE WITH TORQUE SENSING

(71) Applicant: Ford Global Technologies, LLC, Dearborn, MI (US)

(72) Inventors: John Edward Brevick, Livonia, MI (US); Gregory Daniel Goleski, Rochester Hills, MI (US); Jeffrey Edward Maurer, Commerce, MI (US); Bruce Granstrom, Dearborn, MI (US); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 14/710,006

(22) Filed: May 12, 2015

(65) Prior Publication Data
US 2016/0209280 A1    Jul. 21, 2016

Related U.S. Application Data

(60) Provisional application No. 62/105,969, filed on Jan. 21, 2015.

(51) Int. Cl.
| | |
|---|---|
| *G01L 3/00* | (2006.01) |
| *G01L 3/10* | (2006.01) |
| *F16D 1/10* | (2006.01) |
| *F16H 1/00* | (2006.01) |
| *F16D 3/223* | (2011.01) |

(52) U.S. Cl.
CPC ............. *G01L 3/102* (2013.01); *F16D 1/101* (2013.01); *F16H 1/00* (2013.01); *F16D 2001/103* (2013.01); *F16D 2003/22326* (2013.01); *F16D 2300/18* (2013.01)

(58) Field of Classification Search
CPC . G01L 3/102; G01L 3/101; G01L 3/10; G01L 3/08; G01L 3/1457; G01L 25/003; G01L 3/24
USPC ...... 73/862.335, 862.333, 862.331, 862.325, 73/862.321, 862.191, 862.08, 862
See application file for complete search history.

(56) References Cited

U.S. PATENT DOCUMENTS

| | | | |
|---|---|---|---|
| 6,698,299 B2 * | 3/2004 | Cripe ...................... | G01L 3/105 73/862.331 |
| 7,640,814 B2 * | 1/2010 | Cripe ...................... | G01L 3/105 73/862.331 |

(Continued)

*Primary Examiner* — Lisa Caputo
*Assistant Examiner* — Nigel Plumb
(74) *Attorney, Agent, or Firm* — James Dottavio; Brooks Kushman P.C.

(57) ABSTRACT

A powertrain incorporates a link shaft between the transmission output shaft and downstream components in order to facilitate use of a torque sensor. The link shaft includes an inner section splined to the output shaft and an outer section treated to produce a magnetic field that varies based on transmitted torque. The inner section and outer section are separated by a circumferential gap that directs the torque past the treated surface. Use of the link shaft eliminates the need to directly treat the transmission output shaft. Separating the spline and the treated surface radially reduces the axial length required for torque sensing and allows commonality among variants with and without torque sensors and between two wheel drive and four wheel drive variants.

13 Claims, 5 Drawing Sheets

(56) References Cited

U.S. PATENT DOCUMENTS

2012/0191308 A1\* 7/2012 Poskie .................... G01L 3/105
 701/51
2014/0230570 A1\* 8/2014 Kapas .................... G01L 3/101
 73/862.193

\* cited by examiner

TRANSMISSION AND TRANSFER CASE WITH TORQUE SENSING

CROSS-REFERENCE TO RELATED APPLICATIONS

This application claims the benefit of U.S. provision application Ser. No. 62/105,969 filed Jan. 21, 2015, the disclosure of which is hereby incorporated in its entirety by reference herein.

TECHNICAL FIELD

This disclosure relates to the field of automatic transmission and transfer cases. More particularly, the disclosure pertains to installation of a transmission output torque sensor.

BACKGROUND

An automatic transmission establishes various power flow paths having different speed ratios by selectively engaging and disengaging a number of shift elements. The shift elements include friction clutches. A controller sets the torque capacity of each friction clutch by sending control signals. For example, a controller may send a pulse width modulated signal to a solenoid such that the electromagnetic force exerted by the solenoid is proportional to the pulse width. The solenoid may be connected to a spool valve in a valve body such that the hydraulic pressure in a particular passageway of the valve body is proportional to the electromagnetic force. Fluid from the passageway may be routed to a piston apply chamber of a clutch causing the piston to exert a force related to the fluid pressure. The piston force may squeeze friction plates between separator plates to establish a torque capacity of a clutch. Alternatively, the signal may influence the torque capacity by other mechanism such as causing a motor to rotate, thus causing a piston to apply force to a clutch pack. Due to the indirect causal chain between the signal and the clutch torque capacity, a number of unpredictable noise factors may influence the relationship.

When the controller determines that a speed ratio change is needed, the controller may execute a shift by releasing one shift element called an off-going element and engaging another shift element called an on-coming element. For the shift to feel smooth to vehicle occupants, it is important that the torque capacity of the on-coming element and the torque capacity of the off-going element be coordinated with respect to one another and with respect to the engine torque. For example, if the off-going clutch is released prematurely, then the driveshaft torque will drop excessively and the engine speed will rise. This phenomenon is called an engine flare. On the other hand, if the off-going element is released too late, then the two shift elements will resist one another and the output torque will drop excessively. This phenomenon is called a tie-up.

In order to adjust the control signals such that the torque capacities are proper in the presence of unknown noise factors, a controller may utilize a feedback signal. For example, a controller may utilize signals from an input speed sensor and an output speed sensor to compute the current speed ratio of the transmission. An unexpected or excessively large increase in the ratio of input speed to output speed may indicate an engine flare. In response to this information, the controller may increase the torque capacity of the on-coming shift element. However, some errors, such as a tie-up, are not necessarily reflected in the speed ratio. Furthermore, it takes time for an error in shift element torque capacity to show up as a change in the speed ratio. Therefore, it is desirable to supplement this information with a measurement of the transmission output torque.

SUMMARY

A powertrain includes a link shaft adapted to couple a transmission output shaft to a downstream powertrain component. The link shaft includes an inner section and an outer section. The inner section is adapted for fixation to the transmission output shaft by, for example, a spline. The outer section is concentric with and axially overlapping the inner section. An outer surface of the outer section is treated to produce a magnetic field that varies as a transmitted torque varies. The inner and outer sections are separated by a circumferential gap to direct torque from the transmission shaft past the outer surface.

In some embodiments, the link shaft may couple the transmission output shaft directly to a driveshaft. In such embodiments, the link shaft may include a flange fixed to the outer section and having holes such that the driveshaft may be attached to the flange by bolts. In such embodiments, a sensor may be mounted to the transmission housing in close proximity to the outer section of the link shaft and configured to vary an electrical signal in response to changes in the magnetic field. A controller may determine transmission output torque based on the electrical signal.

In some embodiments, the links shaft may couple the transmission output shaft to an input shaft of a transfer case. In such embodiments, a magnetic isolation section may be included between the outer section of the link shaft and the transfer case input shaft. In such embodiments, a sensor may be mounted to the transfer case housing in close proximity to the outer section of the link shaft and configured to vary an electrical signal in response to changes in the magnetic field. A controller may determine transmission output torque based on the electrical signal.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
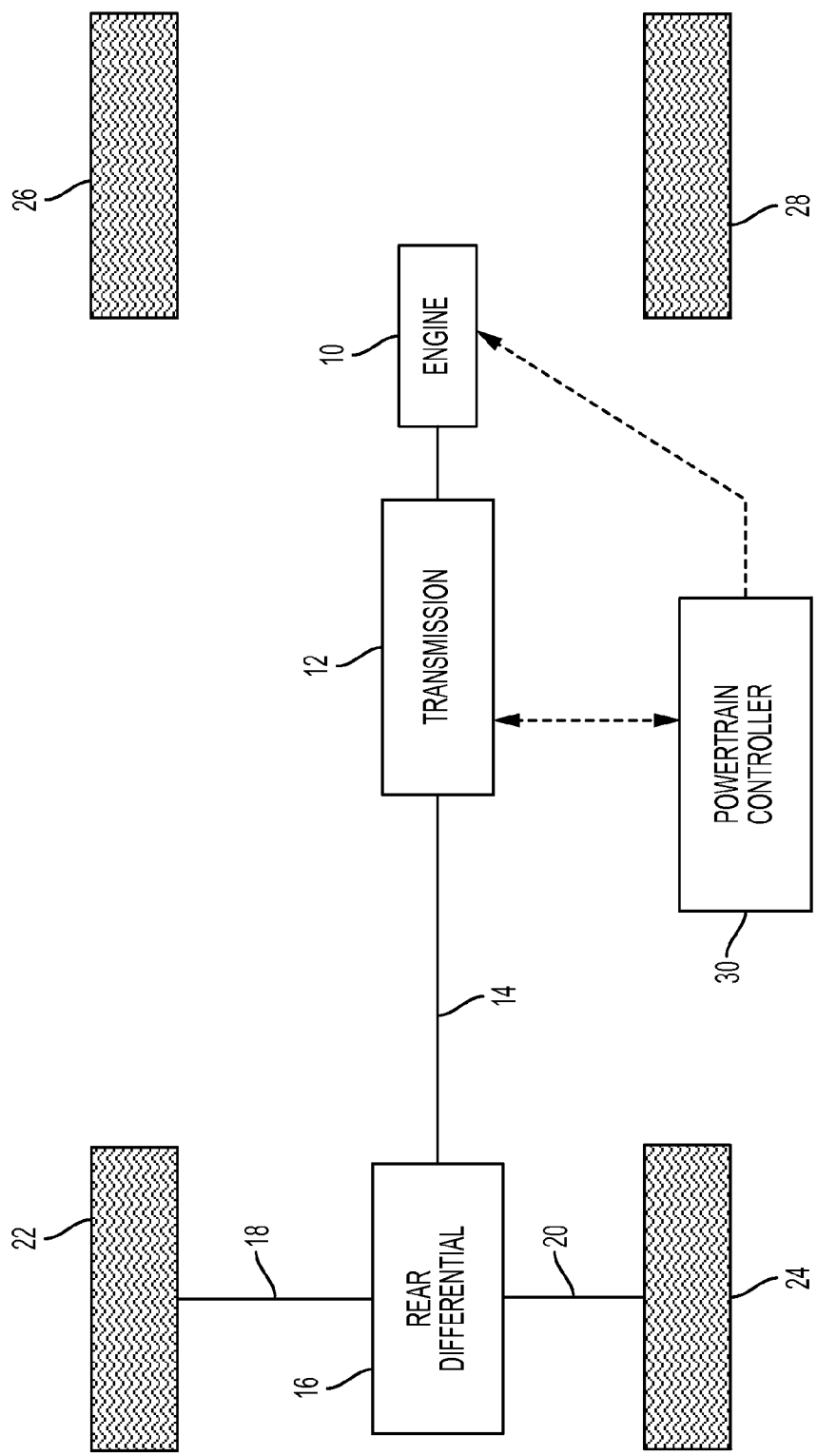
FIG. 1 is a schematic diagram of a rear wheel drive powertrain.

FIG. 1 schematically illustrates a powertrain of a rear wheel drive vehicle. Mechanical connections are illustrated with solid lines while dotted lines represent signals that convey information. Power to propel the vehicle is generated by internal combustion engine 10. This power is conditioned to satisfy vehicle needs by transmission 12 and delivered to rear driveshaft 14. In particular, when the vehicle is at low speed, transmission 12 reduces the speed and multiplies the torque relative to the power provided by the engine. When the vehicle is at high speed, transmission 12 causes driveshaft 14 to rotate faster than the engine crankshaft. Rear differential 16 divides the power from driveshaft 14 between left and right rear axles 18 and 20 which drive left and right rear wheels 22 and 24 respectively. Differential 16 permits the two axles to rotate at slightly different speeds relative to one another when the vehicle turns a corner. Differential 16 also multiplies the driveshaft torque by a fixed ratio called the final drive ratio and changes the axis of rotation by 90 degrees. Left and right front wheels, 26 and 28 respectively, are not powered.

Transmission 12 establishes various power flow paths having different speed ratios by selectively engaging and disengaging a number of shift elements. Controller 30 adjusts the torque capacity of each friction clutch during shift events. For some types of transmissions, such as dual clutch transmissions, controller 30 also continuously adjusts the torque capacity of one of more clutches to launch the vehicle from a stationary position. Controller 30 may utilize signals from transmission 12, such as input and output speed and torque sensors. Controller 30 may also send control signals to engine 10 to adjust the torque output of the engine.

Figure 2:
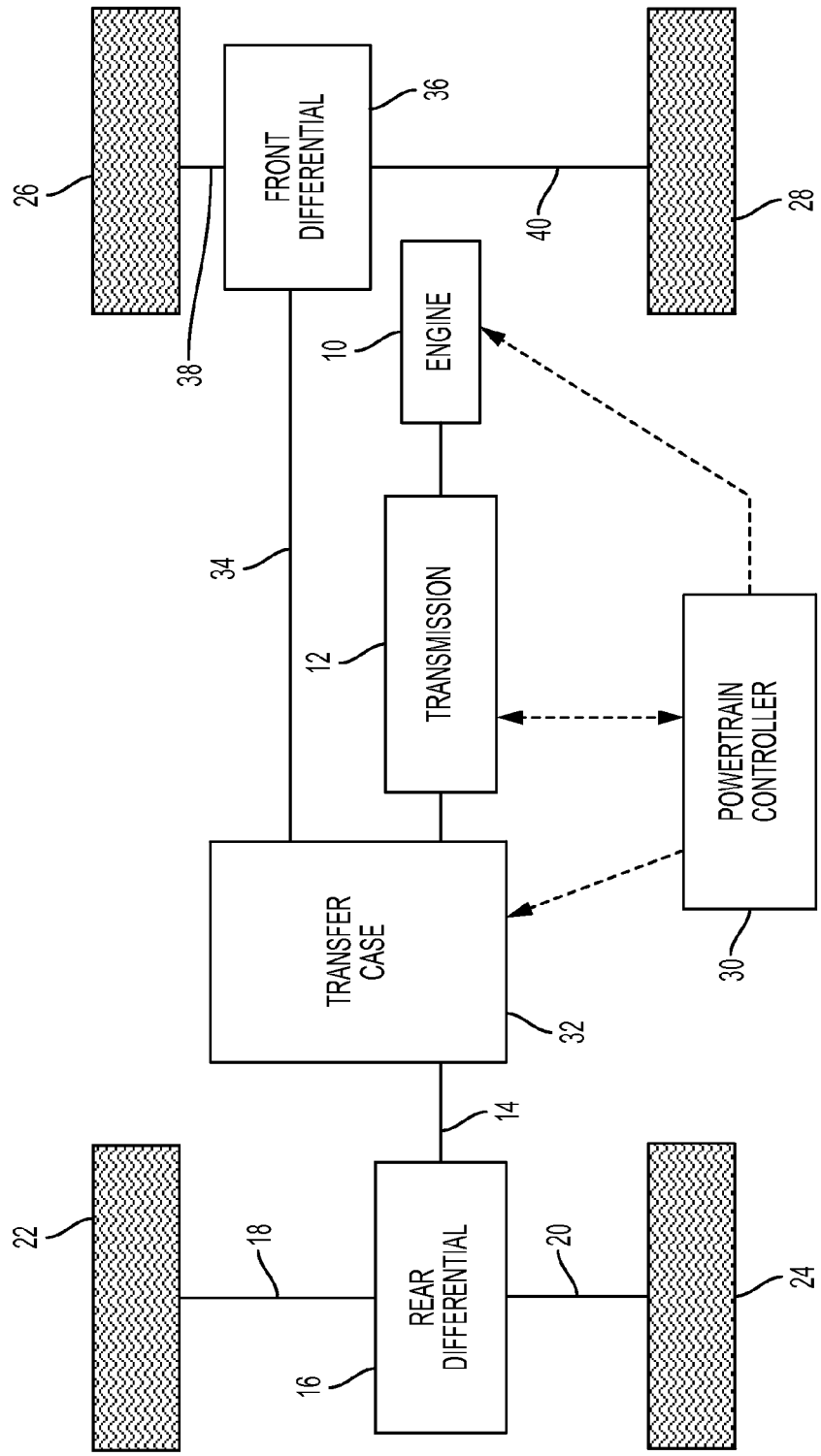
FIG. 2 is a schematic diagram of a four wheel drive powertrain.

FIG. 2 schematically illustrates a four wheel drive vehicle powertrain. Transfer case 32 is interposed between transmission 12 and driveshaft 14. Transfer case 32 may divert a portion of the power from rear driveshaft 14 to front driveshaft 34. Front differential 36 divides the power from front driveshaft 34 between left and right front axles 38 and 40 which drive left and right front wheels 26 and 28 respectively. Like rear differential 16, front differential 36 also multiplies the torque by a fixed final drive ratio and changes the axis of rotation by 90 degrees.

Several types of transfer case are known. In a torque-on-demand (TOD) transfer case, the transmission output shaft is continuously coupled to the rear driveshaft 14. An actively controlled clutch selectively drivably connects the transmission output to the front driveshaft 34 via axis transfer gears or a chain and sprockets. Controller 30 may engage the torque-on-demand clutch is response to sensing a loss of traction at the rear wheels or in anticipation of loss of traction. In a center differential type transfer case, a planetary gear set divides the transmission output torque between the front and rear driveshafts while allowing some speed difference. Many transfer cases of both types also provide a driver controlled coupler that, when engaged, forces the front and rear driveshafts to rotate at the same speed.

Control of transmission clutches during a shift event, control of launch clutches during a launch event, and control of a transfer case torque on demand clutch may all be improved by use of a measurement of transmission output torque. In a four wheel drive powertrain such as the powertrain illustrated in FIG. 2, a measurement of rear driveshaft torque may be used instead of or in addition to a measurement of transmission output torque. One known type of torque sensor is based on materials that have magnetic properties which change in response to shear strain. When a shaft transmits torque, the surface of the shaft deflects in shear. For a given shaft geometry, the surface shear strain is proportional to the torque transmitted by the shaft. A magneto-elastic torque sensor produces an electrical signal that varies in response to the change in the magnetic field. A controller can accurately determine the transmitted torque by processing the electrical signal. Such a torque sensor is described in U.S. Pat. No. 6,698,299.

Figure 3:
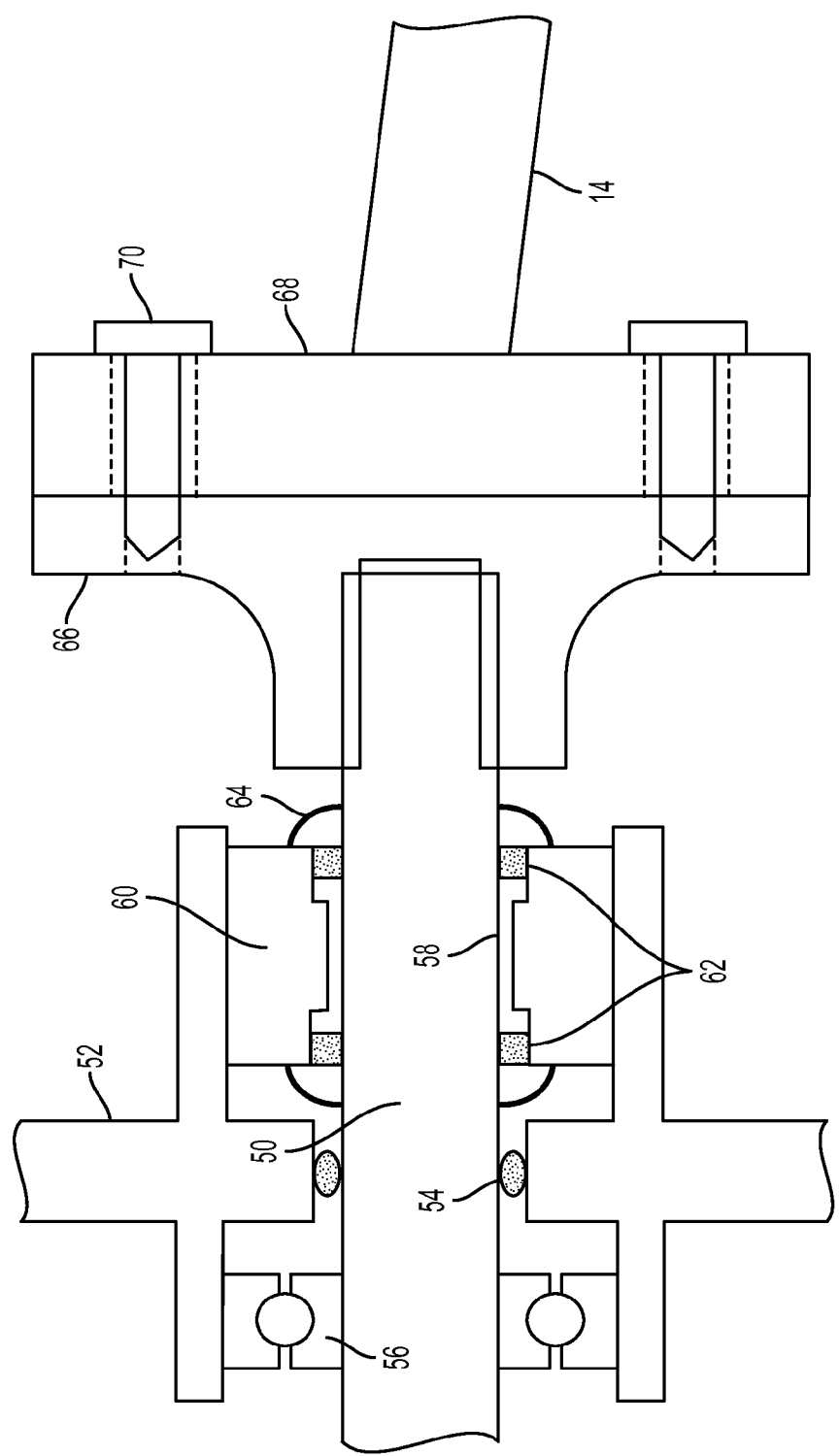
FIG. 3 is a schematic cross section of a rear portion of a transmission and front portion of a driveshaft showing installation of a magneto-elastic output torque sensor.

FIG. 3 illustrates one way of installing an output shaft torque sensor in a rear wheel drive powertrain layout. Transmission output shaft 50 protrudes from the rear portion of transmission housing 52. A seal 54 may preclude contaminants from getting inside the case. The transmission output shaft may be supported with respect to the housing by bearings 56. A section of the output shaft surface 58 behind the transmission case is treated to produce a magnetic field that fluctuates with fluctuations in the output shaft torque. A sensor 60 is mounted to the housing 52 in close proximity to the treated section of the output shaft. The clearance between the sensor and the shaft surface is closely controlled using bearings 62. Seals 64 prevent contamination from entering the gap between the sensor and the shaft surface. A flange 66 is splined to the output shaft 50 behind the sensor 60. A universal joint 68 is bolted to the flange by bolts 70 to couple the driveshaft 14 to the output shaft 50.

The scheme of FIG. 3 has several drawbacks. The output shaft must be lengthened to incorporate the treated section for torque sensing. For an existing transmission design, this requires re-design of the output shaft, which is an expensive component. It may also be necessary to revise the design of the transmission case to add provisions for mounting the sensor 60. For some transmission gearing arrangements, the output shaft is a long component, making the process of treating it to produce the magnetic field cumbersome.

Figure 4:
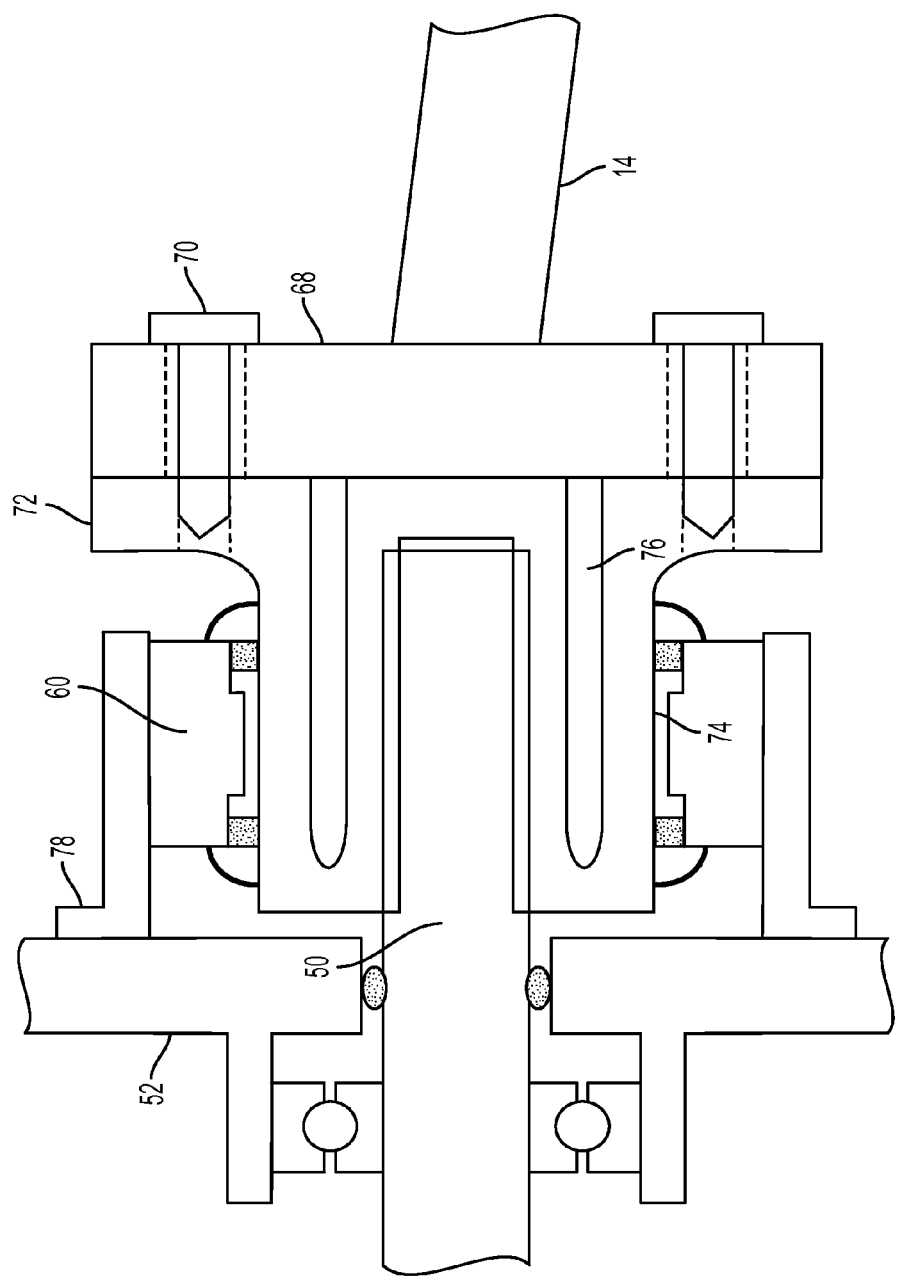
FIG. 4 is a schematic cross section of a rear portion of a transmission and front portion of a driveshaft showing an alternative installation of a magneto-elastic output torque sensor.

FIG. 4 illustrates an improved scheme for installing an output shaft torque sensor in a rear wheel drive powertrain. The output flange of FIG. 3 is replaced by a link shaft 72 that incorporates an output flange. Link shaft 72 is splined to output shaft 50 behind transmission housing 52. Instead of treating a section of the output shaft 50, an outer surface 74 of link shaft 72 is treated to produce a magnetic field that fluctuates based on transmitted torque. A circumferential gap 76 between the inner spline and the treated outer section directs the transmitted torque past the treated section. Gap 76 may be machined into the link shaft. Alternatively, link shaft 72 may be formed by welding an inner section having the spline to an outer treated section. Sensor 60 is mounted outside the treated section on a bracket 78 mounted to transmission housing 52. For example, bracket 78 may attach to a boss that is designed for mounting of a transfer case. The same output shaft 50 and housing 52 may be used for transmission variants having an output torque sensor and for other variants not having a transmission torque sensor. Any axial length increase associated with output torque sensing is minimized. This scheme may also be used to install a torque sensor on the rear driveshaft of a transfer case.

Figure 5:
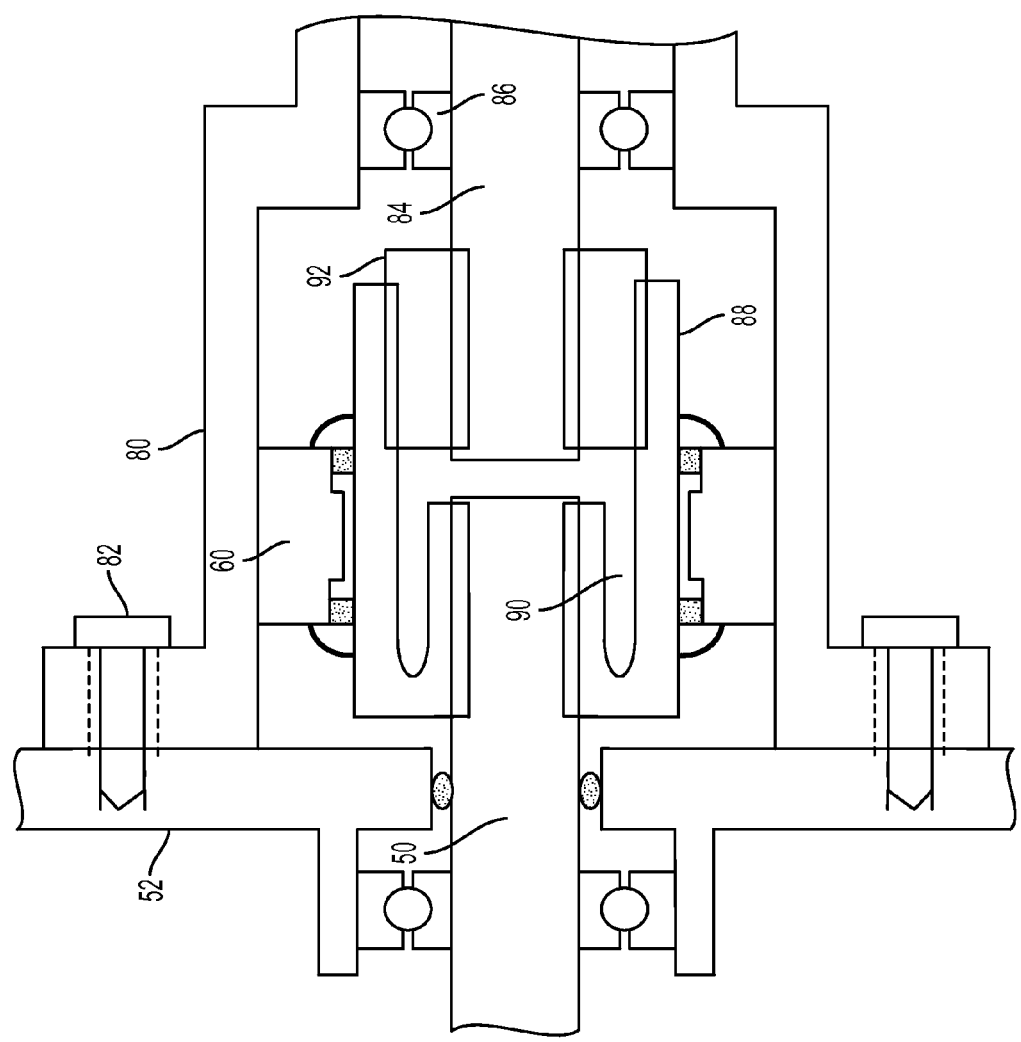
FIG. 5 is a schematic cross section of a rear portion of a transmission and front portion of a transfer case showing installation of a magneto-elastic transmission output torque sensor.

FIG. 5 illustrates a scheme for installing a transmission output shaft torque sensor in a four wheel drive powertrain. A transfer case housing 80 is fastened to the transmission housing 52 by bolts 82. Transfer case input shaft 84 is supported within transfer case housing 80 by bearings 86. Link shaft 88 is splined to transmission output shaft 50. An outer surface of link shaft 88 is treated to produce a magnetic field that fluctuates based on transmitted torque. A circumferential gap 90 between the inner spline and the treated outer section directs the transmitted torque past the treated section. Link shaft 88 may be formed by machining gap 90 or may be formed by welding an inner section having the spline to an outer treated section. Sensor 60 is mounted to transfer case housing 80 outside the treated section. Magnetic isolator 92 is splined to both the transfer case input shaft 84 and to link shaft 88. The torque on demand clutch within the transfer case may be electro-magnetically actuated, which may produce a magnetic field within transfer case input shaft 84. Isolator 92 is made from a non-magnetic material, such as stainless steel, to prevent any magnetic field in transfer case input shaft 84 from influencing the magnetic field produced by the treated section of link shaft 88. The scheme of FIG. 5 permits using the same transmission output shaft for four wheel drive variants as for rear wheel drive variants and does not increase the axial length relative to variants without a torque sensor.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A hollow link shaft comprising:
    an inner section having an inner surface adapted for fixation to a transmission shaft; and
    an outer section concentric with and axially overlapping the inner section and having an outer surface treated to produce a magnetic field that varies as a transmitted torque varies, the inner and outer sections connected for common rotation and separated by a circumferential gap.

2. The link shaft of claim 1 wherein the inner surface is adapted for fixation to the transmission shaft by a spline connection.

3. The link shaft of claim 1 further comprising a flange fixed to the outer section and defining a series of holes adapted for fixation of a driveshaft.

4. The link shaft of claim 1 further comprising a magnetic isolating section fixed to the outer section and adapted for fixation to a transfer case shaft.

5. A powertrain comprising:
    a transmission housing;
    an output shaft supported for rotation with respect to the transmission housing; and
    a link shaft splined to the output shaft, the link shaft having an outer surface axially overlapping the spline and separated from the spline by a gap, the outer surface treated to produce a magnetic field that varies in response to variation in transmitted torque.

6. The powertrain of claim 5 wherein the link shaft defines a flange adapted for fixation to a driveshaft.

7. The powertrain of claim 5 further comprising a sensor mounted to the transmission housing and configured to vary an electrical signal in response to variation in the magnetic field.

8. The powertrain of claim 5 further comprising a transfer case having a transfer case housing fixed to the transmission housing, a transfer case input shaft supported for rotation with respect to the transfer case housing and fixed for rotation with the output shaft.

9. The powertrain of claim 8 wherein the transfer case input shaft is fixed for rotation with the link shaft via a magnetic isolating section.

10. The powertrain of claim 8 further comprising a sensor mounted to the transfer case housing and configured to vary an electrical signal in response to variation in the magnetic field.

11. A powertrain comprising:
    a transfer case housing adapted for fixation to a transmission housing;
    a transfer case input shaft supported for rotation with respect to the transfer case housing; and
    a link shaft having
        an outer section fixed to the transfer case input shaft and having an outer surface treated to produce a magnetic field that varies as a transmitted torque varies, and
        an inner section axially overlapping the outer section and adapted for fixation to a transmission output shaft, the inner and outer sections connected for common rotation and separated by a circumferential gap.

12. The powertrain of claim 11 wherein the outer section of the link shaft is fixed to the transfer case input shaft via a magnetic isolating section.

13. The powertrain of claim 11 further comprising a sensor mounted to the transfer case housing and configured to vary an electrical signal in response to variation in the magnetic field.

* * * * *